Feb. 2, 1960
D. R. JONES
2,923,786
DIAL THERMOMETER ALARM DEVICE
Filed Feb. 28, 1958
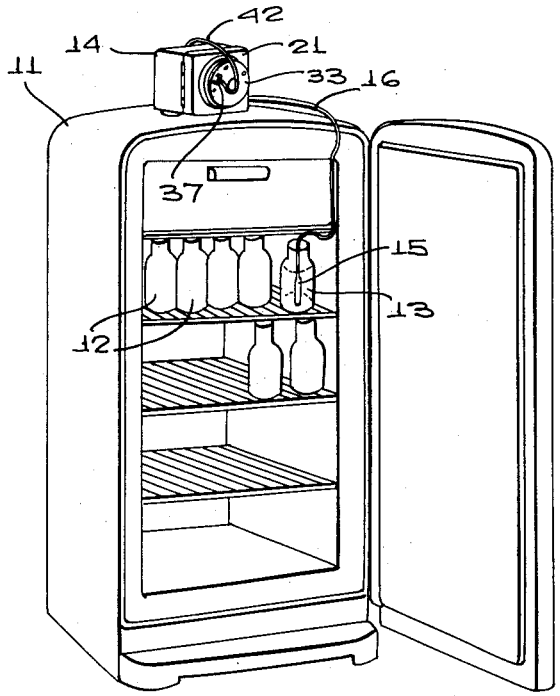
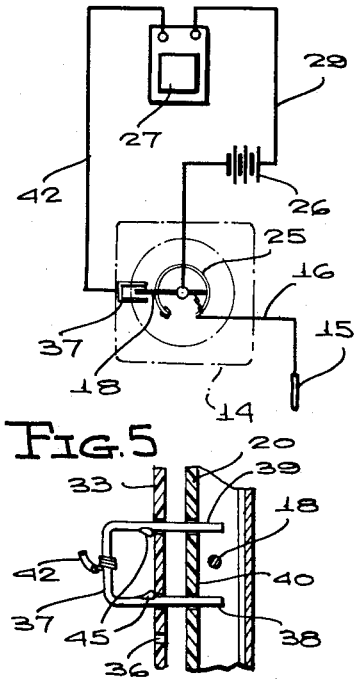
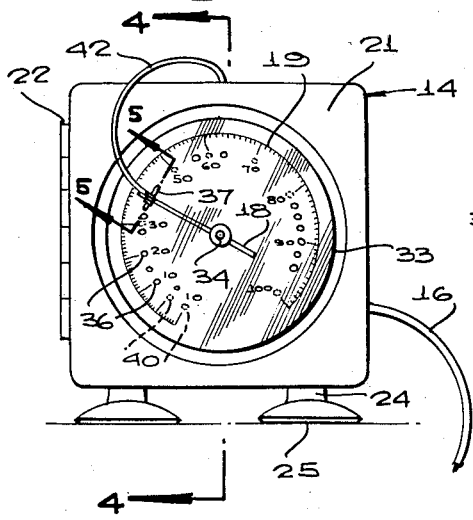
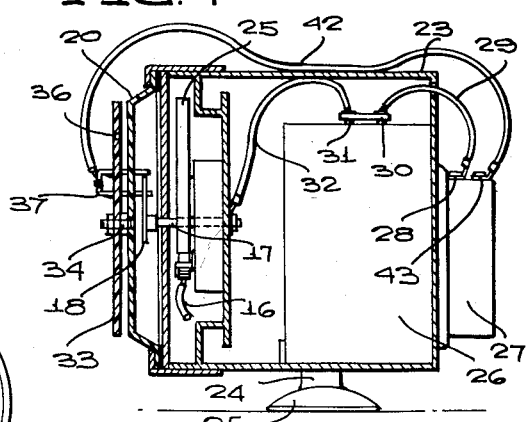
INVENTOR.
DONALD R. JONES
BY
McMorrow, Berman + Davidson
ATTORNEYS

2,923,786
DIAL THERMOMETER ALARM DEVICE

Donald R. Jones, St. Paul, Minn.

Application February 28, 1958, Serial No. 718,233

5 Claims. (Cl. 200—56)

This invention relates to dial thermometers, and more particularly to an alarm device adapted to be employed on a dial thermometer to provide an alarm when the thermometer reading reaches either of two limiting values at the ends of a designated temperature range.

A main object of the invention is to provide a novel and improved alarm device for use on a dial thermometer, said alarm device involving inexpensive components, being easy to install, and being reliable in operation.

A further object of the invention is to provide an improved alarm device adapted to provide a signal when the pointer of a dial thermometer reaches either one of two limiting positions at the opposite ends of a designated temperature range, the device involving relatively compact parts, being independent of the main power supply employed for the associated equipment on which the thermometer is mounted, and being readily adjustable so that it may be employed at any desired location on the dial of the thermometer.

Further objects and advantages of the invention will become apparent from the following description and claims, and from the accompanying drawings, wherein:

Figure 1 is a perspective view of a refrigerator provided with a dial thermometer on which is installed an improved alarm device according to the present invention.

Figure 2 is an electrical wiring diagram showing the circuit connections of the alarm device of Figure 1.

Figure 3 is an enlarged front elevational view of the dial thermometer employed in Figure 1 and illustrating the alarm device mounted thereon.

Figure 4 is a transverse vertical cross sectional view taken on the line 4—4 of Figure 3.

Figure 5 is an enlarged cross sectional detail view taken on the line 5—5 of Figure 3.

Referring to the drawings, 11 designates a conventional refrigerator, for example, a refrigerator employed to store blood, serum, or other material which must be kept within the limits of a designated temperature range, for example, which must maintain containers 12 containing the material within such temperature limits. In accordance with the present invention, a container 13 is filled with suitable liquid, such as water, which will assume substantially the same temperature as the material in the containers 12. The container 13 is positioned in the refrigerator adjacent the containers 12 so that the temperature of the water or other suitable liquid in the container 13 will be very closely the same as that of the material in the containers 12.

Designated at 14 is a dial thermometer which is provided with a sensing element 15, for example, a vessel containing gas, the element 15 being conected by a flexible conduit 16 to a bellows or other expansible and contractible element in the thermometer which responds to changes in temperature experienced by the gas in the vessel 15 in a well known manner to drive a pointer shaft 17. Mounted on the end of the pointer shaft 17 is a metal pointer 18 which thus swings around the axis of the shaft 17 and whose end moves past a circular temperature scale 19 provided on a transparent cover plate 20 secured in the front wall of the main housing of the thermometer 14. The front wall of the main housing, shown at 21, is preferably hinged at 22 to the vertical margin of one of the side walls of the housing so that access may be obtained to the interior of the housing for the purpose of replacing batteries, or the like, as will be presently described. The housing, shown at 23 may be any suitable shape, but is illustrated, merely by way of example, as being of generally cubical shape. The housing is provided with a plurality of spaced depending suporting feet 24 provided at their bottom ends with suction cups 25, whereby the housing may be detachably engaged with the smooth top surface of a device with which it is to be employed, for example, with the top surface of the refrigerator 11.

As shown in Figure 4, the flexible conduit 16 is connected to the expansible member of the thermometer assembly, shown at 25, which may comprise a spirally formed piece of metal tubing which responds to changes in pressure of the gas therein to rotate its center portion, to which the shaft 17 is secured, whereby such rotation is transmitted to said shaft. Shaft 17 is preferably formed of suitable conductive metal and is rigidly connected to the metal pointer 18, being thus in electrical contact with said pointer.

The hinged wall 21 thus carries the working parts of the dial thermometer, the main housing 23 serving as a receptacle for a suitable battery 26. Mounted on the rear wall of the receptacle 23 externally thereof is an alarm bell 27 of conventional construction having one terminal 28 thereof connected by an insulated conductor 29 to one terminal 30 of the battery 26. The remaining terminal 31 of said battery is connected by a flexible insulated conductor 32 to the end of the metal shaft 17.

Obviously, the thermometer may be of the electrically operated type, wherein the sensing element 15 comprises a temperature-responsive electrical device, such as thermocouple, or the like, which is connected to a suitable meter movement mounted in the cover 21 of the thermometer housing, the meter movement being mechanically coupled to the shaft 17 in a conventional manner to rotate the pointer 18.

Designated at 33 is a transparent disc member which is centrally secured by a bolt 34 to the center of the transparent dial cover 20 concentric therewith and in axial alignment with the pointer shaft 17. The disc member 33 is formed with circularly arranged pairs of spaced openings 36 which are at common radial distances from the bolt 34 and which are thus spaced along the temperature scale 19 on the subjacent dial cover plate 20. The pairs of openings 36 are spaced to define upper and lower limits of respective controlled temperature ranges between which it may be desired to maintain the temperature in the interior of the refrigerator 11, or in any other space to be supervised.

Designated at 37 is a generally U-shaped electrode having parallel arms of substantial length, shown at 38 and 39, the arms 38 and 39 being spaced to engage in a selected pair of openings 36. The transparent dial cover plate 20 is likewise formed with pairs of openings 40 spaced in the same manner as the openings 36 and located substantially at the same radial distance from the axis of shaft 17 as the openings 36, the openings 40 being thus registrable with the openings 36, whereby the arms 38 and 39 may be engaged therethrough after being engaged through a selected pair of openings 36.

As shown in Figure 5, the electrode 37 is engaged through a selected pair of openings 36, representing the upper and lower limits of a specified range of temperatures between which the interior of the refrigerator 11 is to be maintained, the arms 38 and 39 being thus disposed at opposite sides of the thermometer pointer 18.

The electrode 37 is electrically connected by an insulated conductor 42 to one terminal 43 of the alarm bell 27. As above explained, the remaining terminal of said alarm device, namely, the terminal 28, is connected by the insulated conductor 29 to the battery terminal 30.

While designated as a bell, the alarm device 27 may be any suitable signal device, such as a signal lamp, a buzzer, or the like, or a low voltage solenoid coil having secondary contact points which close when the coil is energized.

When the temperature in the refrigerator 11 changes so that it reaches the upper or lower limit of the specified temperature range in which the containers 12 must be kept, the pointer 18 conductively engages either of the arms 38 or 39. This establishes a connection between the conductor 32 and the conductor 42, thus energizing the alarm device 27. This immediately notifies the personnel associated with the supervision of the storage of the material as to the necessity for taking appropriate action to reestablish the correct temperature.

As will be readily apparent, the disc 33 may be readily adjusted relative to the dial plate 20, since the disc 33 is rotatably adjustable around the axis of the fastening bolt 34. Thus, the disc 33 may be adjusted to provide correct alignment between selected pairs of openings 36 therein and selected openings 40 in the dial plate 20.

It will be further apparent that the device operates independently of the power source employed to energize the refrigeration equipment associated with the refrigerator 11, since the battery 26 is independent of the external power source. Thus, if the power fails for the refrigerator, the temperature alarm device will still continue to function and will provide a warning when the temperature reaches the upper or lower limit of the specified temperature range.

As shown in Figure 5, the U-shaped electrode 37 is provided on its arms 38 and 39 with the inwardly extending stop lug elements 45, 45 which are engageable with the disc member 33 to limit the positioning of the electrode to that illustrated in Figure 5, namely, to correctly establish the proper positions of the inner ends of the arms 38 and 39 on the opposite sides of the pointer element 18.

While a specific embodiment of an improved alarm device for a dial thermometer has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a thermometer of the type including a dial and a conductive rotary pointer element mounted to rotate over the dial, an alarm switch device comprising a disc member mounted on said dial, and a U-shaped electrode detachably secured to said disc member and having parallel arms extending on opposite sides of said pointer element at points on said dial corresponding to selected upper and lower temperature limits.

2. In a thermometer of the type including a dial and a conductvie rotary pointer element mounted to rotate over the dial, an alarm switch device comprising a disc member, means adjustably securing said disc member to said dial for adjustment around the rotary axis of said pointer element, and a U-shaped electrode detachably secured to said disc member and having parallel arms extending on opposite sides of said pointer element at points on said dial corresponding to selected upper and lower temperature limits.

3. In a thermometer of the type including a dial and a conductive rotary pointer element mounted to rotate over the dial, an alarm switch device comprising a disc member, a fastening bolt extending concentrically through said disc member and dial and adjustably securing said disc member to said dial, and a U-shaped electrode having parallel arms extending through said disc member and dial and extending on opposite sides of said pointer element at points on said dial corresponding to selected upper and lower temperature limits.

4. In a thermometer of the type including a dial and a conductive rotary pointer element mounted to rotate over the dial, an alarm switch device comprising a disc member formed with spaced openings arranged arcuately thereon and concentrically therewith, means adjustably securing said disc member to said dial in adjacent coaxial relation therewith and a U-shaped conductive electrode member having arms spaced to engage through a pair of said openings located on opposite sides of said pointer element at points corresponding to selected upper and lower temperature limit values on said dial, said arms being constructed and arranged to extend on opposite sides of the pointer element in positions to be engaged thereby at said selected upper and lower temperature limit values.

5. In a thermometer of the type including a dial and a conductive rotary pointer element mounted to rotate over the dial, an alarm switch device comprising a disc member formed with spaced openings arranged arcuately thereon and concentrically therewith, means adjustably securing said disc member to said dial in adjacent coaxial relation therewith, a U-shaped conductive electrode member having arms spaced to engage through a pair of said openings located on opposite sides of said pointer element at points corresponding to selected upper and lower temperature limit values on said dial, and stop means on said arms engageable with said disc member and located so that when said stop means engage the disc member the arms extend on opposite sides of the pointer element in positions to be engaged thereby at said selected upper and lower temperature limit values.

References Cited in the file of this patent

UNITED STATES PATENTS

| | | |
|---|---|---|
| 1,990,659 | Lindsey | Feb. 12, 1935 |
| 2,446,173 | Ekblom | Aug. 3, 1948 |
| 2,448,776 | Crise | Sept. 7, 1948 |
| 2,462,566 | Smith | Feb. 22, 1949 |
| 2,472,638 | White | June 7, 1949 |